United States Patent [19]

Danilenko et al.

[11] 4,009,470
[45] Feb. 22, 1977

[54] PRE-EMPTIVE, ROTATIONAL PRIORITY SYSTEM

[75] Inventors: Michael Danilenko, West St. Paul; James Robert Davis, Jr., New Brighton; Arthur Flets Boehm, St. Paul, all of Minn.

[73] Assignee: Sperry Rand Corporation, New York, N.Y.

[22] Filed: Feb. 18, 1975

[21] Appl. No.: 550,800

[52] U.S. Cl. .......................................... 340/172.5
[51] Int. Cl.² ...................... G06F 3/04; G06F 9/18
[58] Field of Search ............................... 340/172.5

[56] References Cited

UNITED STATES PATENTS

| | | | |
|---|---|---|---|
| 3,333,252 | 7/1967 | Shimabukuro | 340/172.5 |
| 3,544,974 | 12/1970 | Tan | 340/172.5 |
| 3,553,656 | 1/1971 | Bernhardt | 340/172.5 |
| 3,573,856 | 4/1971 | Best et al. | 340/172.5 |
| 3,735,357 | 5/1973 | Maholick et al. | 340/172.5 |
| 3,798,591 | 3/1974 | Phillips et al. | 340/172.5 |
| 3,832,692 | 8/1974 | Henzel et al. | 340/172.5 |

Primary Examiner—Melvin B. Chapnick
Attorney, Agent, or Firm—Kenneth T. Grace; Thomas J. Nikolai; Marshall M. Truex

[57] ABSTRACT

A priority system in which eight priority request signals from eight associated requestors R7–R$\phi$ may simultaneously request access to an associated memory unit and may be honored in one of several priority modes. In a first mode the requestors R7–R$\phi$ are honored pre-emptively or in a numerically descending ordered manner in which priority selection is from the highest ordered priority requestor R7 first to the lowest ordered priority requestor R$\phi$ last. In a second mode the requestors R7–R$\phi$ are functionally divided into 4 groups of 2 requestors per group in which the priority request signals from the 4 groups 4, 3, 2, 1 of requestors may be selected pre-emptively, e.g., groups 4; 3; 2; 1 of requestors R7, R6; R5, R4; R3, R2; R1, R$\phi$ respectively, are honored in a numerically descending ordered manner in which the priority selection is from the highest priority group 4 first to the lowest priority group 1 last and in which priority between requestors within a group, e.g., requestors R5, R4 in group 3, is rotational such that in the event both requestors R5, R4 are requesting priority the requestor not last honored is honored first, e.g., if the higher ordered requestor R5 was last honored and requestors R5, R4 are now both requesting access to the memory storage unit, the order of priority will be rotated with the lower ordered requestor R4 having priority over the higher ordered requestor R5. Rotational priority between adjacent groups of requestors is also provided.

9 Claims, 14 Drawing Figures

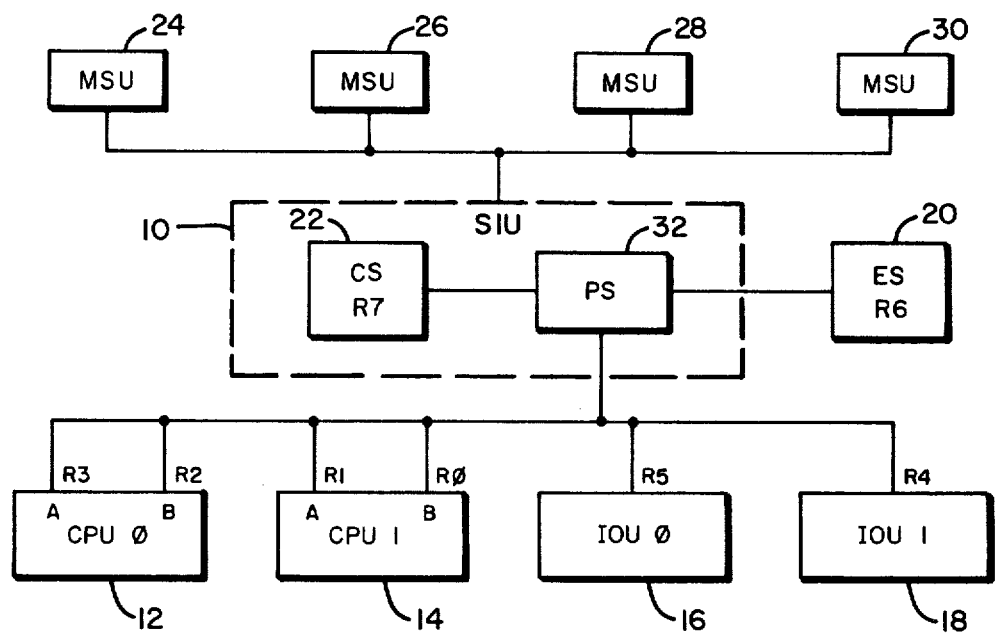
_Fig. 1_
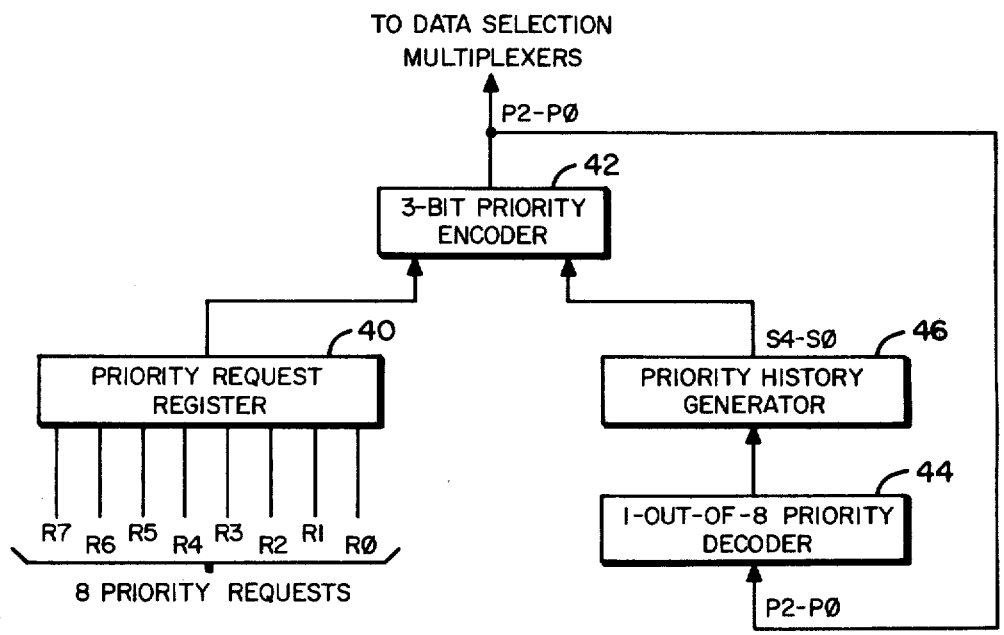
_Fig. 2_

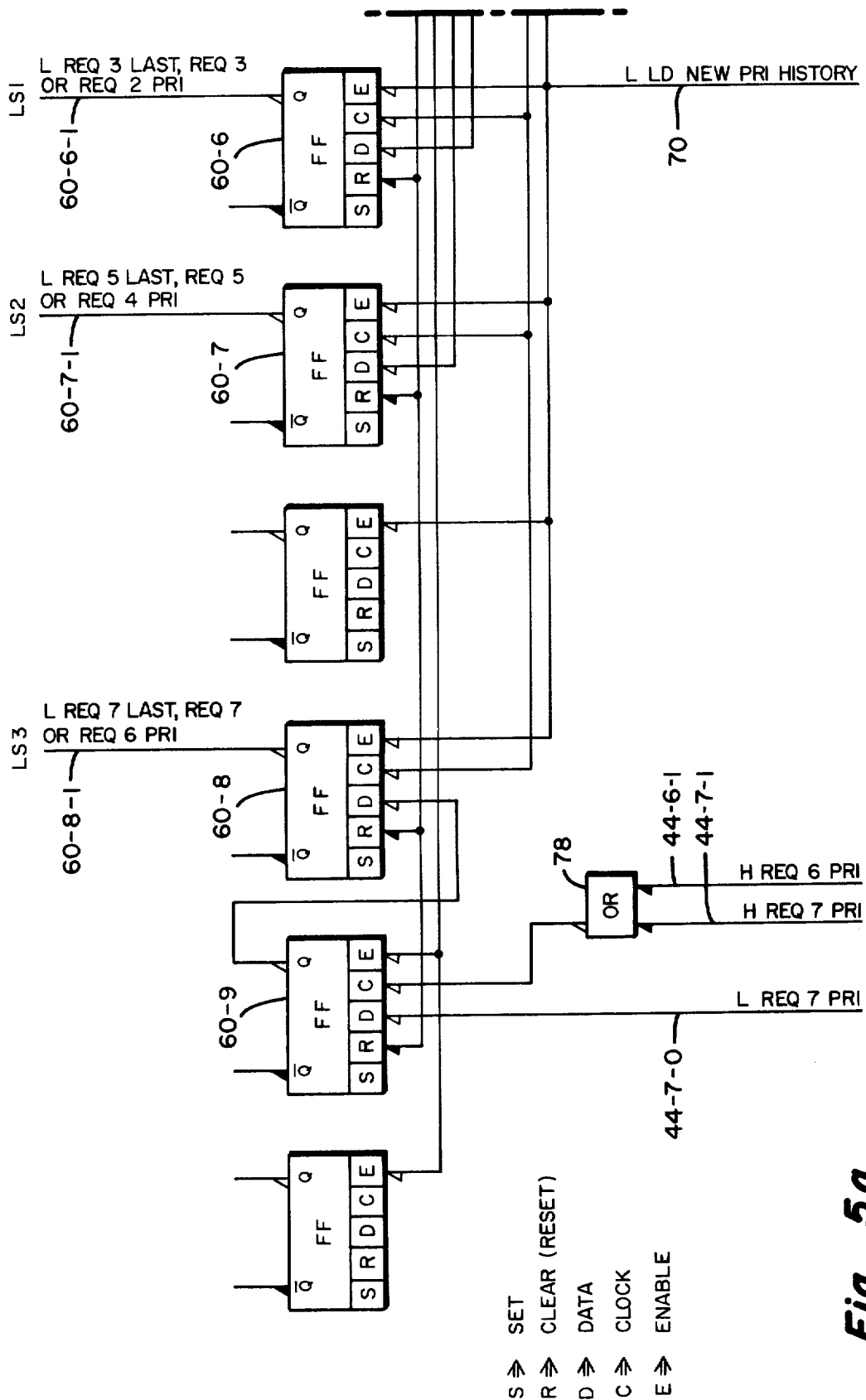

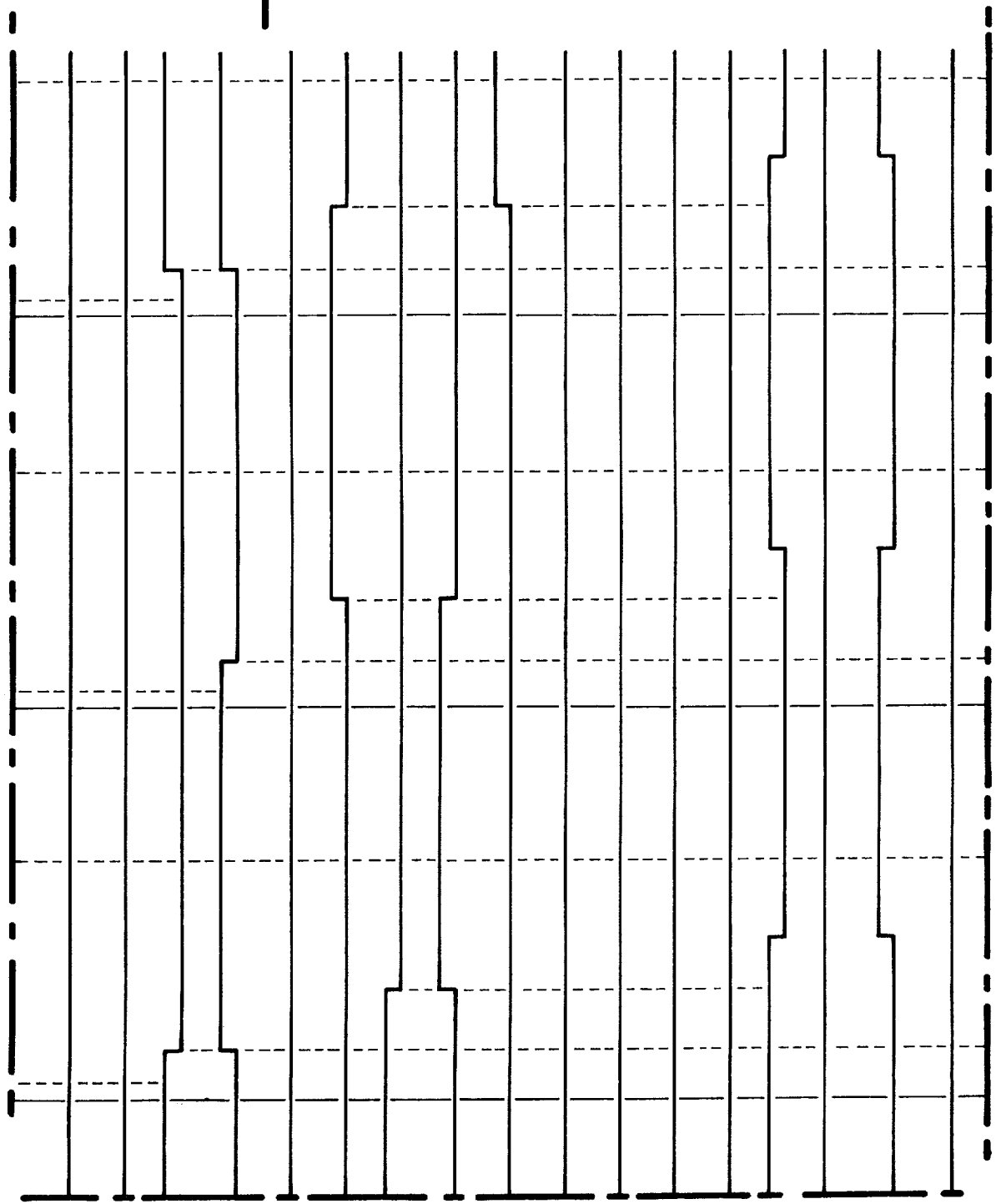

NOTES:
A. RX HONORED.
B. RX CLEARED.
C. LOW SIGNAL LEVEL IMPLIES FALSE OR INACTIVE CONDITION.
D. HIGH SIGNAL LEVEL IMPLIES TRUE OR ACTIVE CONDITION.

PRE-EMPTIVE, ROTATIONAL PRIORITY SYSTEM

BACKGROUND OF THE INVENTION

In the prior art it is known to honor priority request signals from a plurality of requestors on a pre-emptive basis. In this pre-emptive selection method, the R requestors R-1 through 0 are assigned priority in a numerically descending ordered manner in which priority selection is from the highest ordered priority requestor R-1 through to the lowest ordered priority requestor 0 last. One example of a pre-emptive selection priority system is that of the Henzel, et al, Pat. No. 3,832,692. In such a system the lower ordered requestors may wait an inordinate period of time for their priority request signals to be honored. The present invention is directed toward a novel priority system in which the last-honored higher-ordered requestor may be rotated in priority with another lower-ordered requestor such that the lower-ordered requestor may be given temporary priority over the last-honored higher-ordered requestor.

SUMMARY OF THE INVENTION

The priority system of the present invention includes a priority request register for receiving and storing 8 priority request signals from the associated 8 requestors R7–R$\phi$. The priority request signals are then coupled to a 3-bit priority encoder that determines the one requestor, RX, that is to be honored or granted priority. The 3-bit priority encoder generates the 3 priority bits P2, P1, P$\phi$, that are coupled to the data selection multiplexers for access to memory and that are also coupled to a 1-out-of-8 decoder, for decoding, to define the last requestor honored, RX. The output of the 1-out-of-8 decoder is then coupled to a priority history generator that accumulates the history of prior honored requestors and that generates 5 history pointers S4-S$\phi$ that define the prior history of the honored requestors. These history pointers S4–S$\phi$ are then coupled to the 3-bit priority encoder to condition it such that the desired priority mode is effected when a new priority history is desired after the honoring of the last honored requestor, RX. The requestor last honored is the requestor of a group or of groups of requestors that are requesting service, which last honored requestor was granted service more recently than the other requestors of the group or groups.

BRIEF DESCRIPTION OF THE DRAWINGS

FIG. 1 is a block diagram of an electronic data processing system into which the present invention is incorporated.

FIG. 2 is a block diagram of the priority system of the present invention.

DESCRIPTION OF THE PREFERRED EMBODIMENT

Figure 3:
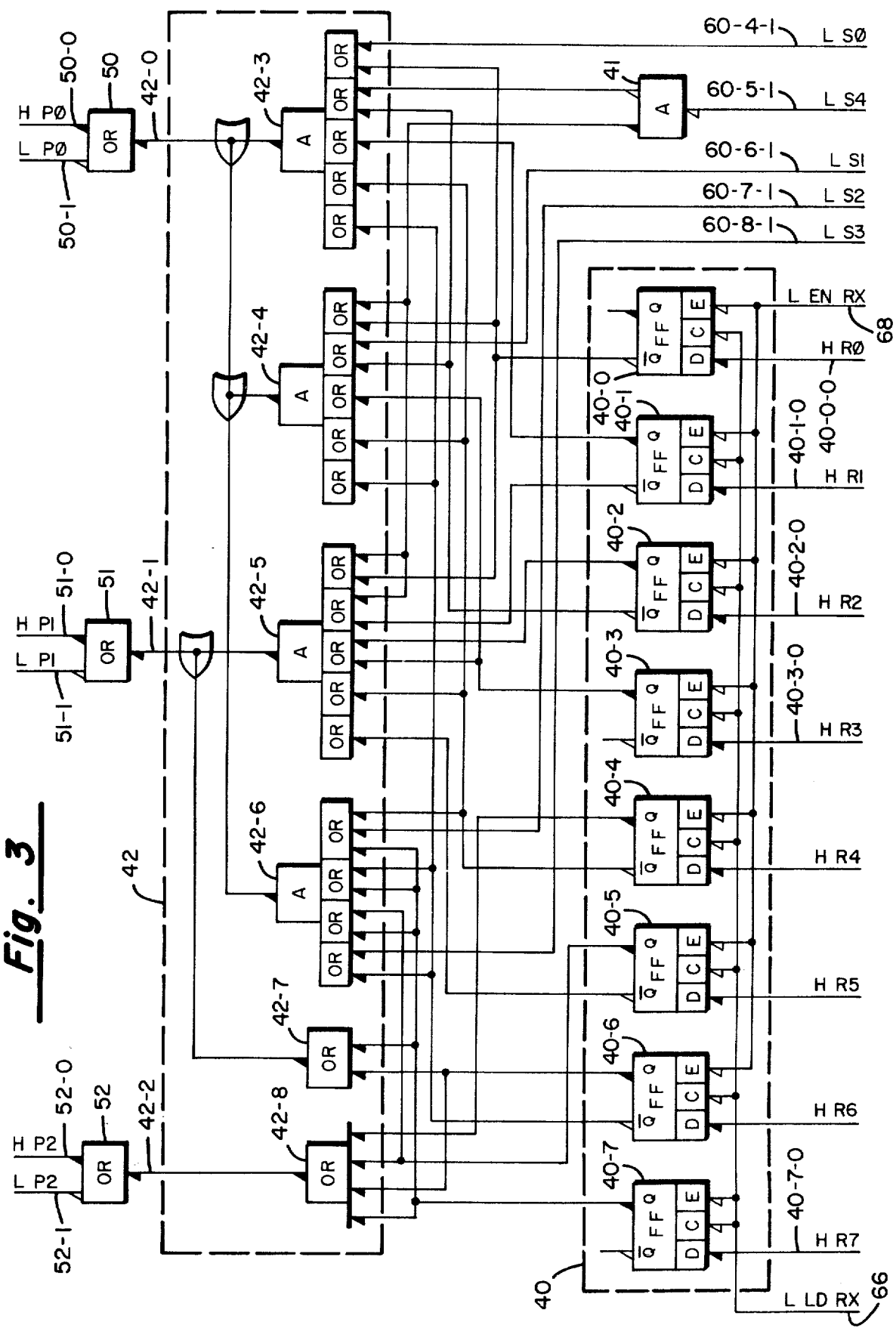
FIG. 3 is a logic diagram of the priority request register and the 3-bit priority encoder of FIG. 2.

With particular reference to FIG. 1 there is presented a block diagram of an electronic data processing system into which the present invention is incorporated.

The system of FIG. 1 includes a storage interface unit (SIU) 10 that functions as a means for providing access by eight requestors R7 through R$\phi$ to any one of a plurality of memory storage units (MSU) 24, 26, 28, 30. Provided in this system are two central processing units (CPU) 12 and 14 each having two channels A, B that function as separate requestors: R$\phi$, R1 for CPU 1 and R2, R3 for CPU $\phi$. Additionally provided are two input/output units (IOU) 16 and 18; IOU $\phi$ and IOU 1 each having a single channel and functioning as a separate requestor R4 and R5, respectively. CPU $\phi$ and CPU 1 may be broadly defined as the means whereby data obtained through SIU 10 are manipulated and whereby IOU $\phi$ and IOU 1 provide the means whereby external peripheral equipment has access to the elements of the system via SIU 10. Also provided is an exerciser section (ES) 20, requestor R6, that functions as a test device for exercising the functional operation of SIU 10 and its operational cooperation with the other elements of FIG. 1. Lastly noted, and as an integral part of the internal electronics of SIU 10, is control section (CS) 22, requestor R7, that functions as a means of controlling the internal operation of SIU 10. For a more detailed description of the operation of SIU 10 reference may be had to the co-pending patent application of V. K. Andersen, et al, filed Nov. 11, 1974, having Ser. No. 522,553, now U.S. Pat. No. 3,967,247.

With particular reference to the following Table A, Priority Order, there is provided a description of the pre-emptive and rotational priority order provided by priority system (PS) 32 incorporated within SIU 10 whereby the requestors R7 through R$\phi$ obtain priority, and in effect control, of the operation of SIU 10.

As can be seen in the following Priority Order, priority system 32 has the capability of providing two primary, alternative modes of priority order: a pre-emptive priority order, or a rotational priority order. In the pre-emptive priority order the requestors R7 through R$\phi$ are assigned priority order in a descending, ordered manner from the highest pre-emptive priority order of requestor R7 to the lowest pre-emptive priority order of requestor R$\phi$. Alternatively, priority system 32 also provides a rotational priority order in which certain requestors within a group of requestors rotate preemption such that, e.g., as noted with requestors R5 and R4, if requestors R5 and R4 are both requesting service: if requestor R5 was last honored then requestor R4 is honored while, alternatively, if requestor R4 was last honored, then requestor R5 is honored.

TABLE A

PRIORITY ORDER

PRE-EMPTIVE

| | | |
|---|---|---|
| Highest | R7 | SIU Control Section |
| | R6 | SIU Exerciser Section |
| | R5 | IOU $\phi$ |
| | R4 | IOU 1 |
| | R3 | Processor$\phi$A |
| | R2 | Processor$\phi$B |
| | R1 | Processor 1A |
| Lowest | R0 | Processor 1B |

ROTATIONAL

R7 and R6 Pre-empt R5, R4, R3, R2, R1, R$\phi$
R7 and R6 Rotate if both request service:
  if R7 last honored then R6 is honored
  if R6 last honored then R7 is honored
and
R5 and R4 Pre-empt R3, R2, R1, R$\phi$
R5 and R4 Rotate if both request service:
  if R5 last honored then R4 is honored
  if R4 last honored then R5 is honored
R3 or R2 and R1 or R$\phi$ Rotate if R3 or R2 and TABLE A-continued R1 or Rφ both request service:
  if R3 or R2 last honored then R1 or Rφ is honored
  if R1 or Rφ last honored then R3 or R2 is honored
R3 and R2 Rotate if both request service:
  if R3 last honored then R2 is honored
  if R2 last honored then R3 is honored
and
R1 and Rφ Rotate if both request service:
  if R1 last honored then Rφ is honored
  if Rφ last honored then R1 is honored This arrangement ensures that if, e.g., IOU φ and IOU 1 are continuously requesting service, the higher ordered priority requestor R5 does not preclude the lower ordered requestor R4 from obtaining access to SIU 10. Under these conditions the priority requests of requestors R5 and R4 rotate ensuring that each requestor is granted alternate access to SIU 10. Also, rotational priority between adjacent groups of requestors is provided. In this mode, requestors R3 or R2 or R1 or Rφ rotate preemption. That is, if either requestor R3 or R2 was last honored then requestor R1 or Rφ is honored while if either requestor R1 or Rφ was last honored then requestor R3 or R2 is honored.

With particular reference to FIG. 2 there is presented a block diagram of the priority system of the present invention, which, in the illustrated embodiment, is constructed of emitter coupled logic (ECL) using the Motorola 10,000 Series of small scale integrated (SSI) components. In this embodiment, the 8 priority requests, i.e., the 8 priority request signals, from the 8 requestors R7 through Rφ are received on their respectively associated input lines at priority request register 40. Priority request register 40 consists of a plurality, e.g., 8, of priority request flip-flops (FFs), a separate one associated with its respectively associated input line, into which the respectively associated priority request signal is loaded when properly enabled and clocked by the associated data processing system. The priority request signals loaded, or stored, in priority request register 40 are then coupled to 3-bit priority encoder 42 which provides at its output, on 3 separate lines, binary coded, e.g., 3 priority bits P2, P1, Pφ that represent the requestor R7 through Rφ whose request is being honored — see Table B. These 3 priority bits are, in turn, coupled to 1-out-of-8 priority decoder 44 which decodes the 3 priority bits P2, P1, Pφ coupling to priority history generator 46 an active signal on one of 8 lines coupled thereto. Priority history generator 46, from the information supplied to it by the 1-out-of-8 priority decoder 44, generates a plurality, e.g., 5, of history pointers S4 through Sφ that, via five associated lines, are coupled to 3-bit priority encoder 42. The history pointers S4 through Sφ affect the encoding function of 3-bit priority encoder 42 to implement the pre-emptive/rotational priority order noted above under the heading Priority Order. This operation of the priority system of FIG. 2 is fully defined by the truth table of Table C.

With particular reference to FIG. 3 there is presented the logic diagram of priority request register 40 and 3-bit priority encoder 42 of FIG. 2. As previously discussed with particular reference to FIG. 2, the priority request signals from the associated requestors R7 through Rφ are coupled to their associated input lines and are then loaded into their associated priority request FFs 40-7 through 40-0 when concurrently enabled by L ⇒⊣ load RX (L LD RX) on line 66 and L ⇒⊣ enable RX (L EN RX) on line 68 [wherein a Low or Lo or L level signal implies ( ⇒ ) an open arrow head ( ⊣ ) and, conversely, a High or Hi or H level signal implies ( ⇒ ) a closed arrow head ( ⊣ ) on the associated line]. Both signals coupled thereto by the associated electronic data processing system. With the appropriate history pointers S4 through Sφ from the priority history generator 46 coupled to their associated input lines, 3-bit priority encoder 42 couples to the associated ORs 52, 51, 50 the associated binary encoded priority bits P2, P1, Pφ, respectively, indicative of the particular requestor R7 through Rφ that is to be honored — see Table B.

TABLE B

| REQUESTOR HONORED | PRIORITY BITS | | |
|---|---|---|---|
| | OR 52-0 P 2 | OR 51-0 P 1 | OR 50-0 P φ |
| R 7 | 1 | 1 | 1 |
| R 6 | 1 | 1 | 0 |
| R 5 | 1 | 0 | 1 |
| R 4 | 1 | 0 | 0 |
| R 3 | 0 | 1 | 1 |
| R 2 | 0 | 1 | 0 |
| R 1 | 0 | 0 | 1 |
| R φ | 0 | 0 | 0 |

1 ⇒ H ⇒ Active     0 ⇒ L ⇒ Inactive

TABLE C

| PRIORITY REQUESTS | | | | | | | | HISTORY POINTERS | | | | | PRIORITY BITS | | | REQ. HONORED |
|---|---|---|---|---|---|---|---|---|---|---|---|---|---|---|---|---|
| R 7 | R 6 | R 5 | R 4 | R 3 | R 2 | R 1 | R φ | S 4 | S 3 | S 2 | S 1 | S φ | P 2 | P 1 | P φ | R X |
| H | L | X | X | X | X | X | X | X | X | X | X | X | H | H | H | R 7 |
| H | X | X | X | X | X | X | X | X | H | X | X | X | H | H | H | R 7 |
| L | H | X | X | X | X | X | X | X | X | X | X | X | H | H | L | R 6 |
| X | H | X | X | X | X | X | X | X | L | X | X | X | H | H | L | R 6 |
| L | L | H | L | X | X | X | X | X | X | X | X | X | H | L | H | R 5 |
| L | L | H | X | X | X | X | X | X | X | H | X | X | H | L | H | R 5 |
| L | L | L | H | X | X | X | X | X | X | X | X | X | H | L | L | R 4 |
| L | L | X | H | X | X | X | X | X | X | L | X | X | H | L | L | R 4 |
| L | L | L | L | H | L | L | L | X | X | X | X | X | L | H | H | R 3 |
| L | L | L | L | H | L | X | X | H | X | X | X | X | L | H | H | R 3 |
| L | L | L | L | H | X | L | L | X | X | X | H | X | L | H | H | R 3 |
| L | L | L | L | H | X | X | X | H | X | X | H | X | L | H | H | R 3 |
| L | L | L | L | L | H | L | L | X | X | X | X | X | L | H | L | R 2 |
| L | L | L | L | L | H | X | X | H | X | X | X | X | L | H | L | R 2 |
| L | L | L | L | X | H | L | L | X | X | X | L | X | L | H | L | R 2 |
| L | L | L | L | X | H | X | X | H | X | X | L | X | L | H | L | R 2 |
| L | L | L | L | L | L | H | L | X | X | X | X | X | L | L | H | R 1 |
| L | L | L | L | L | L | H | X | X | X | X | X | H | L | L | H | R 1 |
| L | L | L | L | X | X | H | L | L | X | X | X | X | L | L | H | R 1 |
| L | L | L | L | X | X | H | X | L | X | X | X | H | L | L | H | R 1 |
| L | L | L | L | L | L | L | H | X | X | X | X | X | L | L | L | R φ |
| L | L | L | L | L | L | X | H | X | X | X | X | L | L | L | L | R φ |

TABLE C-continued

| PRIORITY REQUESTS | | | | | | | | HISTORY POINTERS | | | | | | PRIORITY BITS | | | REQ. HONORED |
|---|---|---|---|---|---|---|---|---|---|---|---|---|---|---|---|---|---|
| R7 | R6 | R5 | R4 | R3 | R2 | R1 | Rφ | S4 | S3 | S2 | S1 | Sφ | | P2 | P1 | Pφ | R X |
| L | L | L | L | X | X | X | H | L | X | X | X | L | | L | L | L | Rφ |
| L | L | L | L | X | X | L | H | L | X | X | X | X | | L | L | L | Rφ |
| | | | See Note 1 | | | | | | | See Note 2 | | | | | | See Note 1 | |

Notes:
1. H ⇒ 1 ⇒ Active, L ⇒ 0 ⇒ Inactive
2. See Table D for Meaning of H and L.
3. X ⇒ Don't Care.

Figure 4:
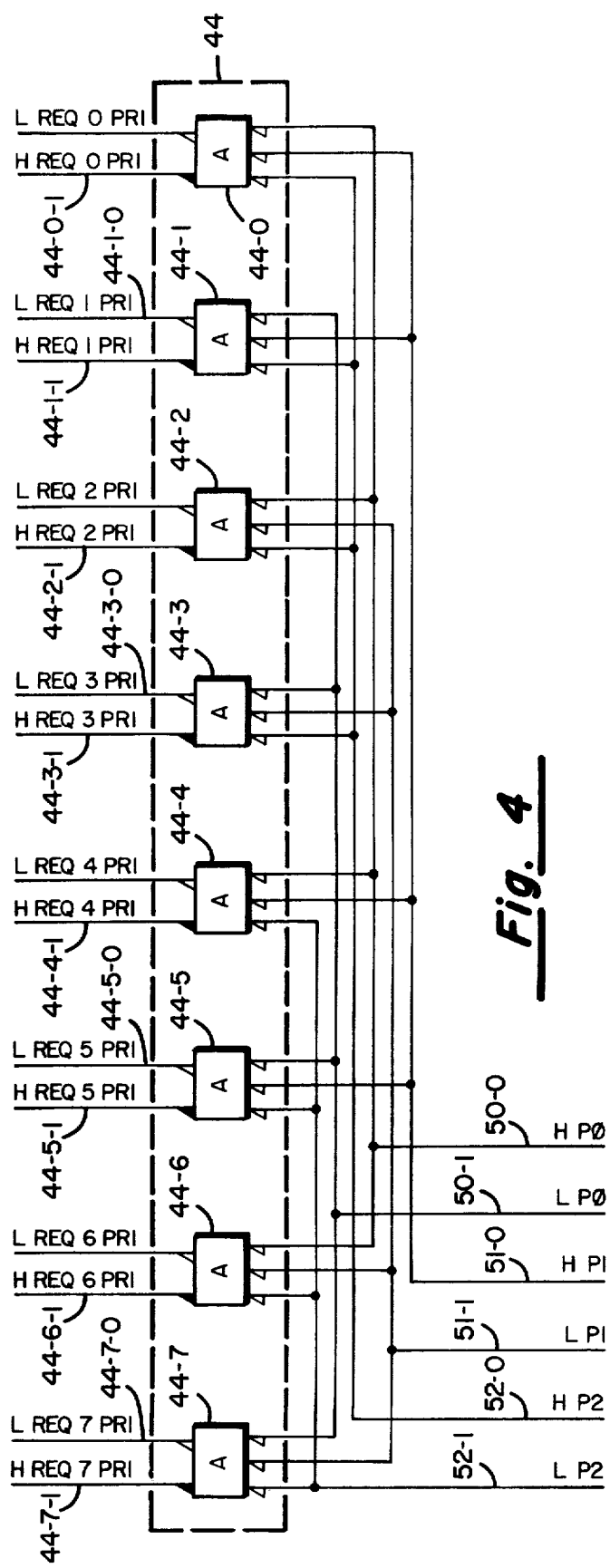
FIG. 4 is a logic diagram of the 1-out-of-8 priority decoder of FIG. 2.

With particular reference to FIG. 4 there is presented the logic diagram of 1-out-of-8 priority decoder 44 of FIG. 2. The 1-out-of-8 decoder 44 receives as its inputs the 3 priority bits P2, P1, Pφ from 3-bit priority encoder 42 and provides as the output therefrom a single active or True signal from one of the ANDs 44-7 through 44-0 that is indicative of the last requestor that was honored by the priority system of FIG. 2. As an example of this, assume that the last requestor to be honored was requestor Rφ with the priority bits P2, P1, Pφ from 3-bit priority encoder 42 being 0, 0, 0, respectively, on the associated priority bit lines. With this configuration, the output of 3-bit priority encoder 42 on the associated output lines 42-2, 42-1, 42-0 are L, L, L, respectively, (where a L ⇒ Lo ⇒ 0 ⇒ 4 and a H ⇒ Hi ⇒ 1 ⇒ 4 ), causing the associated ORs 52, 51, 50 to emit a False signal (whereby all of the noted signal polarities are reversed). At this time, the signals on lines 52-0, 51-0, 50-0 are L ⇒ 4 and on lines 52-1, 51-1, 50-1 are H ⇒ 4 . With these inputs to 1-out-of-8 priority decoder 44 of FIG. 4 only AND 44-0 is satisfied coupling a True or active signal (whereby the signal polarities are as noted) to its output lines 44-0-0, 44-0-1, all other ANDs 44-6 through 44-1 coupling False or inactive signals to their output lines (whereby the noted signal polarities are reversed).

Figure 5:
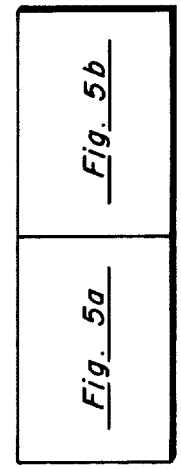
FIG. 5, comprised of FIGS. 5a, 5b, is a logic diagram of the priority history generator of FIG. 2.
Figure 5B:
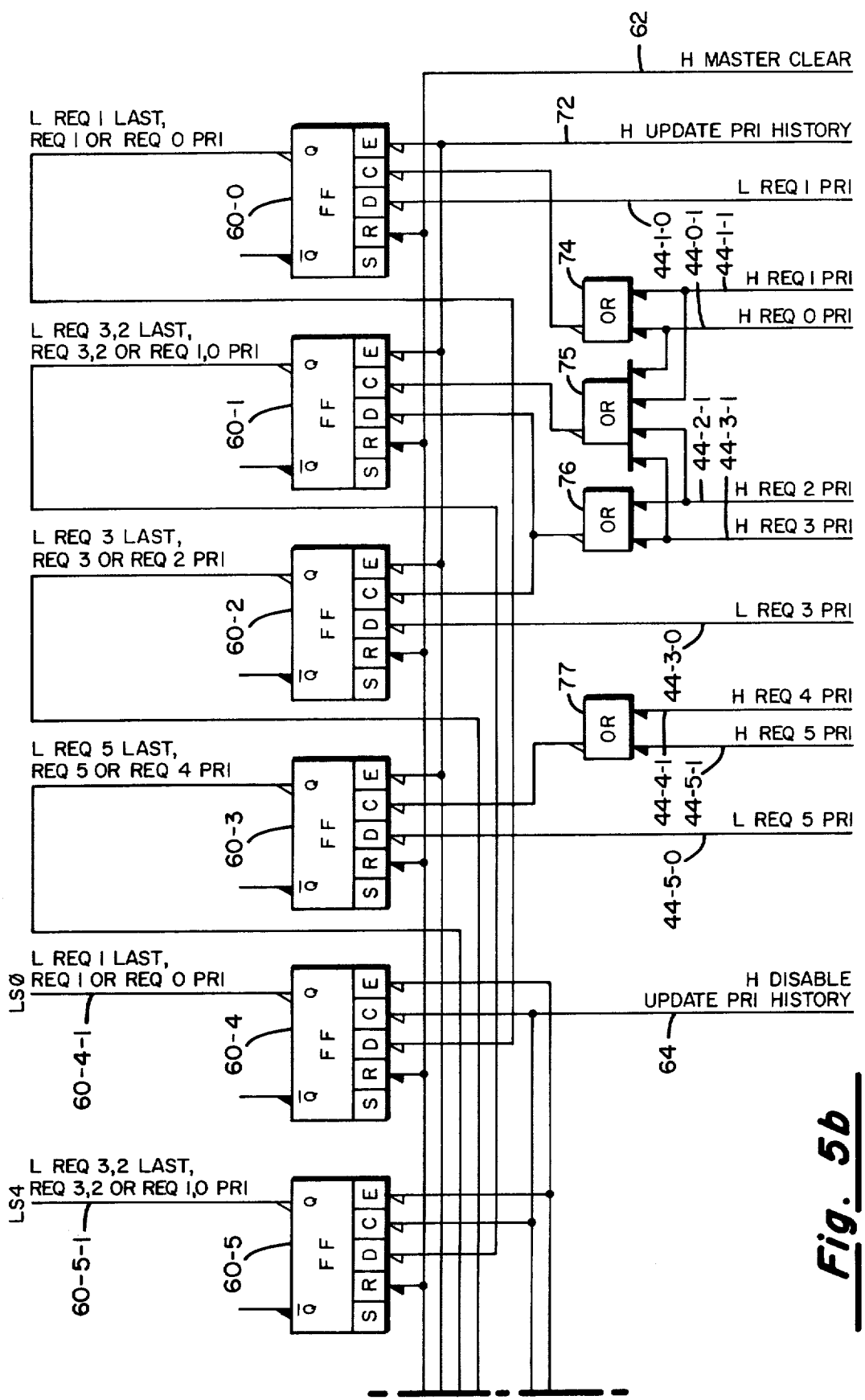
Figures 6, 6A:
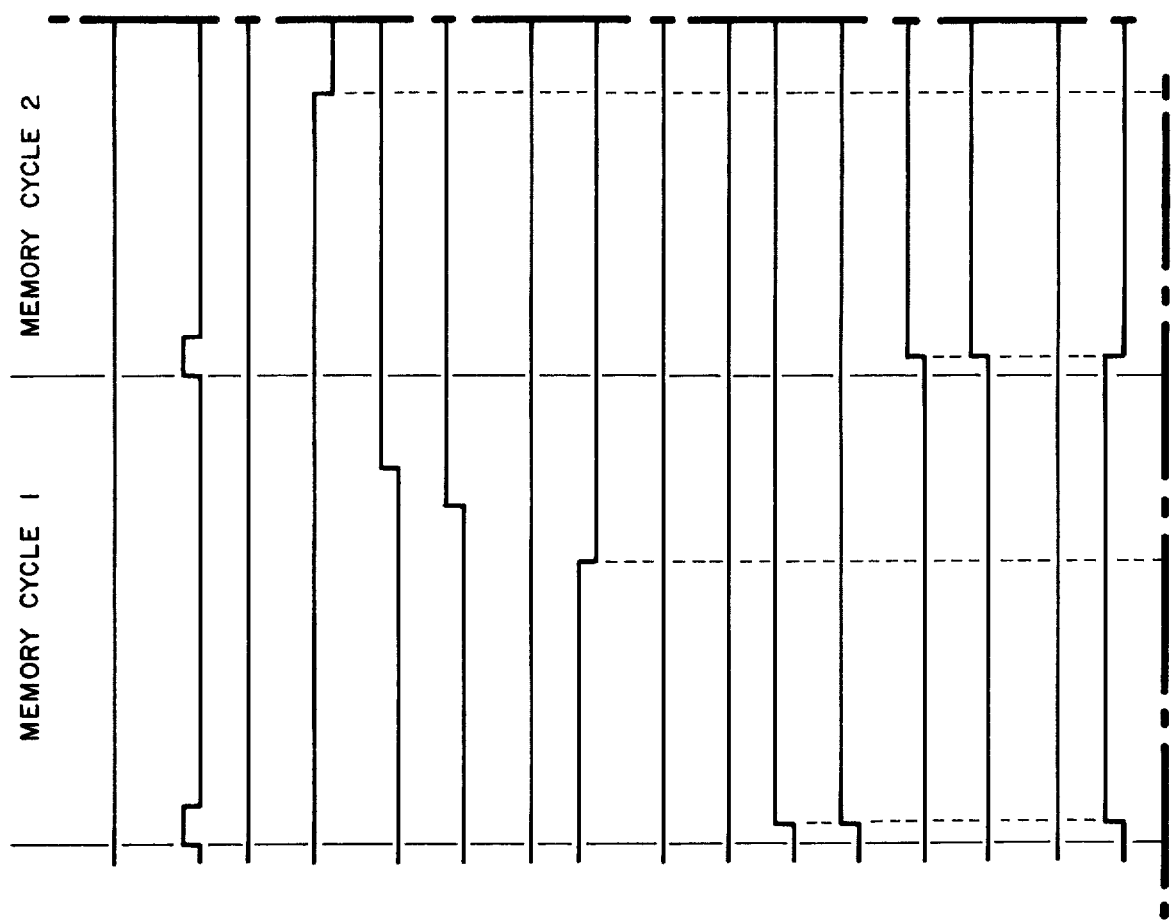
FIG. 6 comprised of FIGS. 6a, 6b, 6c, 6d, 6e, 6f, is a timing diagram for the priority system of FIG. 2.
Figure 6B:
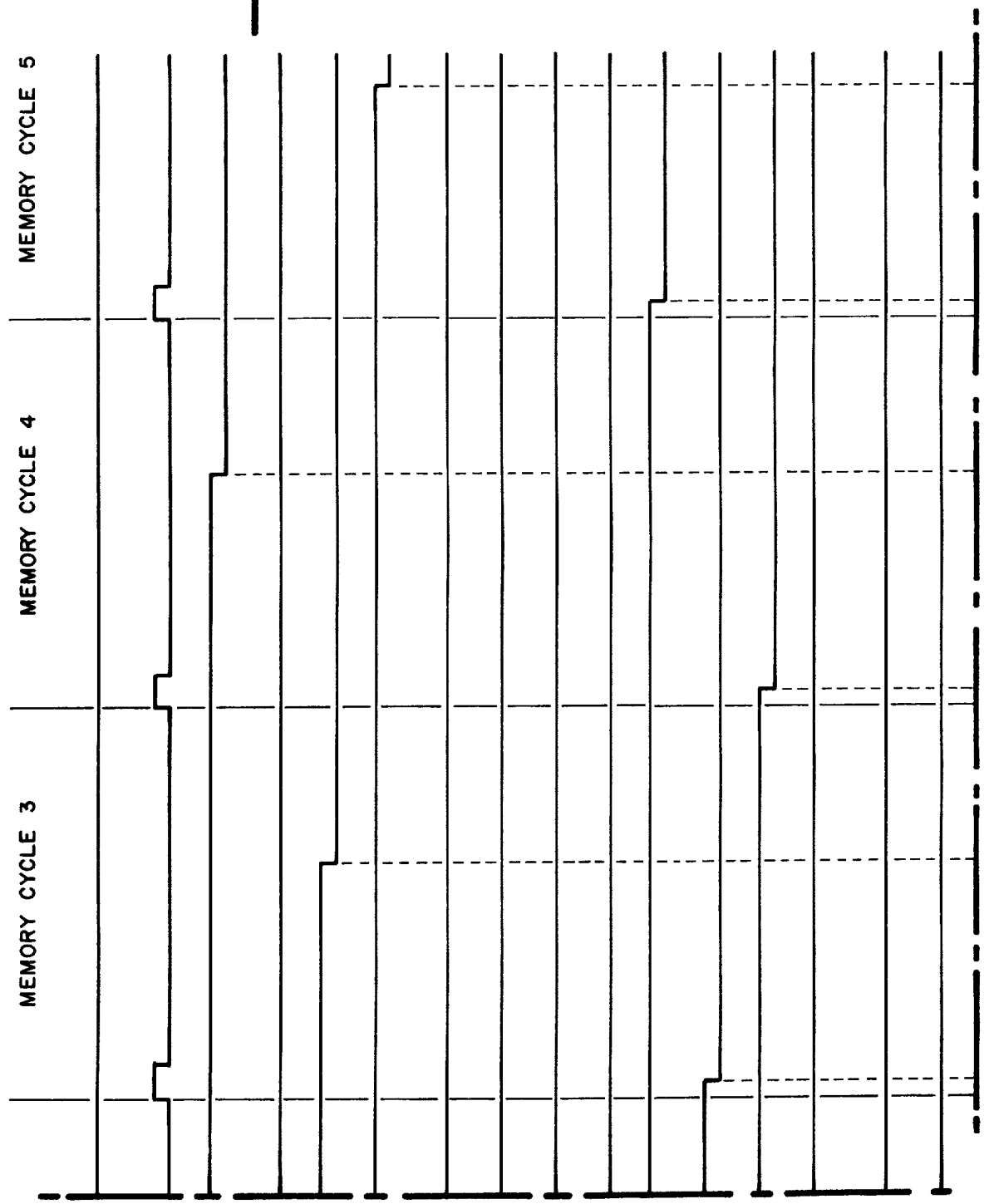
Figure 6C:
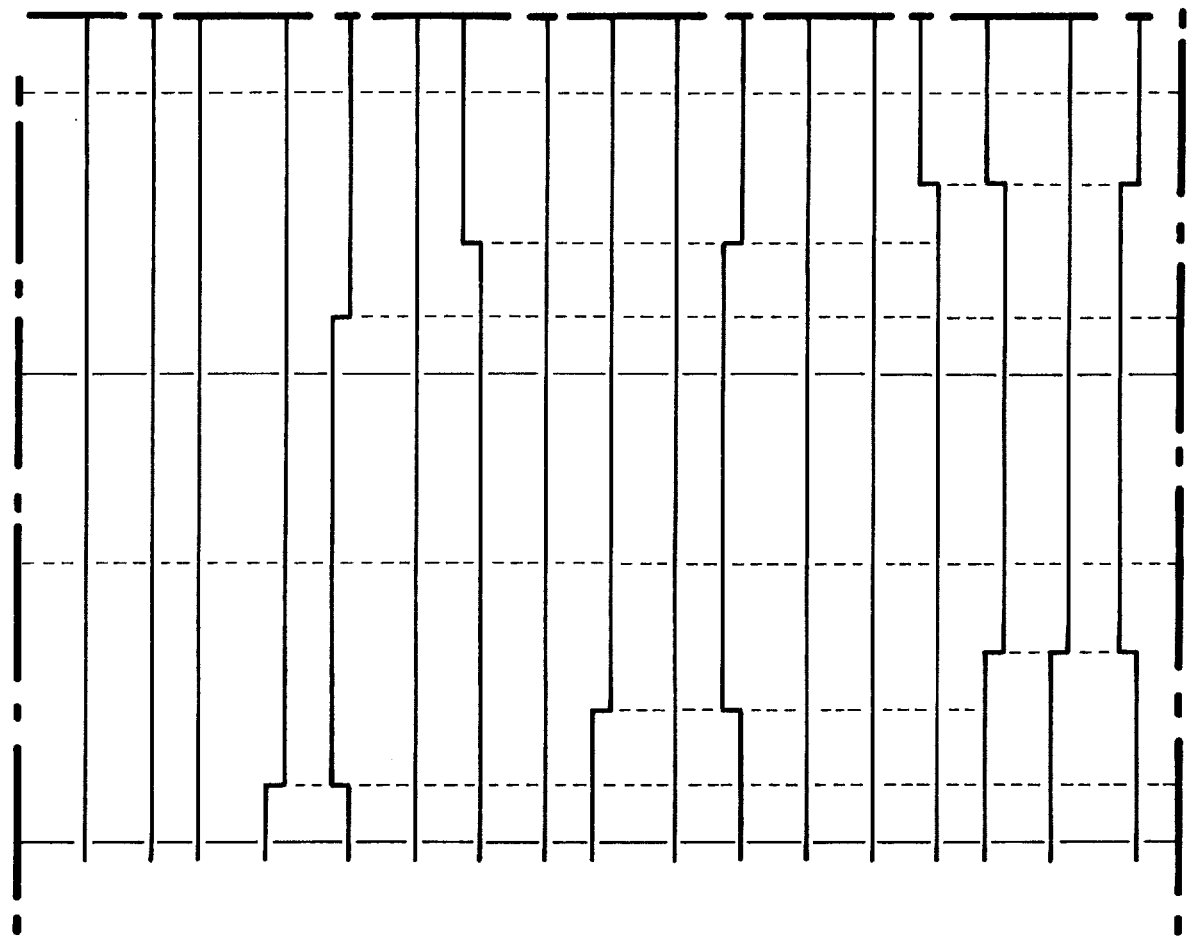
Figure 6E:
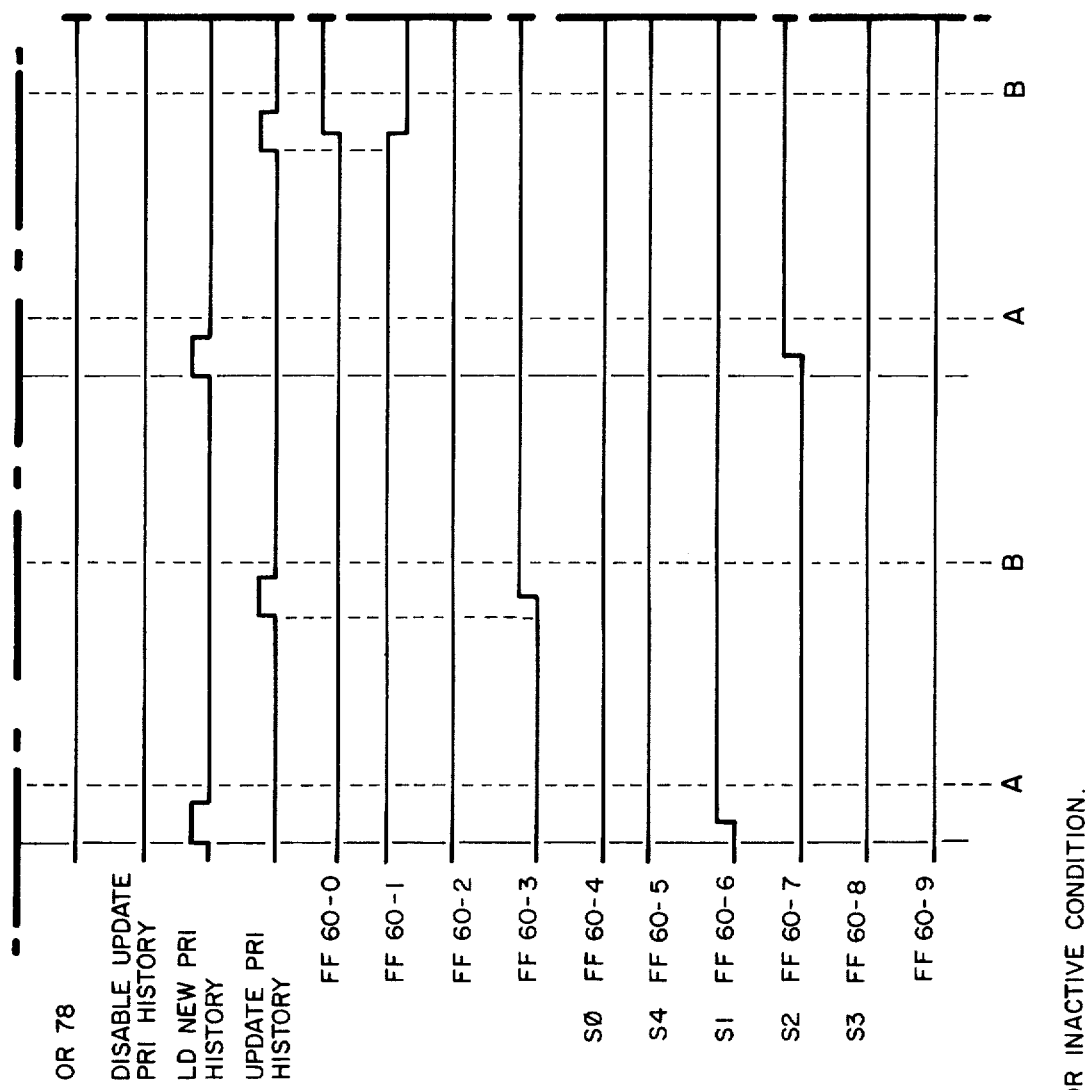
Figure 6F:
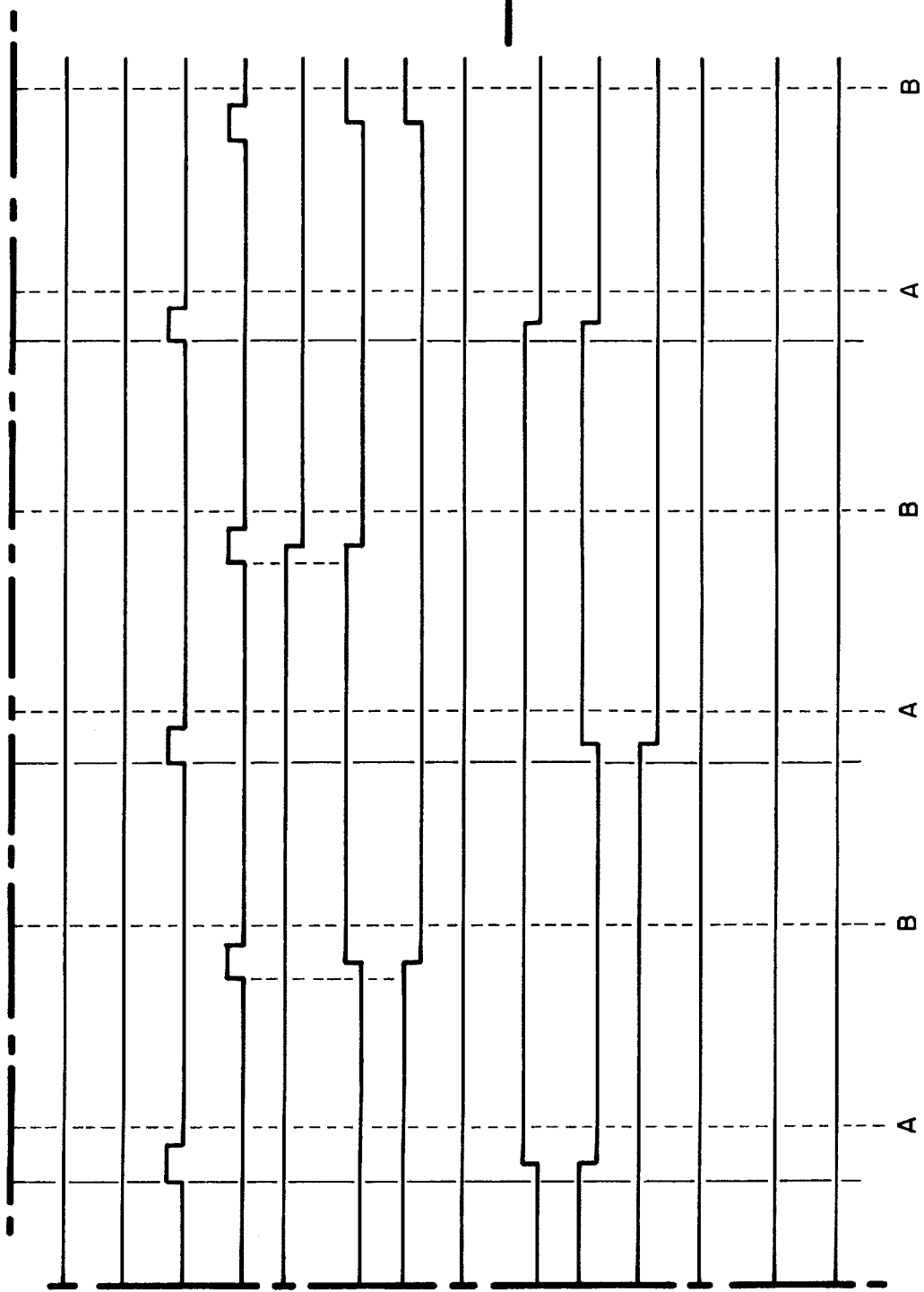

With particular reference to FIG. 5 there is presented a logic diagram of priority history generator 46 of FIG. 2. As illustrated in FIG. 2, priority history generator 46 receives as its inputs the outputs of 1-out-of-8 priority decoder 44 which outputs are determined by the 3 priority bits P2, P1, Pφ that identify the requestor last honored — see Table B. These outputs from the respective output lines of the associated ANDs 44-7 through 44-0 of 1-out-of-8 priority decoder 44 — see FIG. 4 — when coupled by their respectively associated lines to priority history generator 46 of FIG. 5 (along with the necessary control and timing signals from the associated data processing system as illustrated in FIG. 6) generate, by means of FFs 60-9 through 60-0, the output signals or history pointers S4 through Sφ having the meanings noted in Table D.

Table D indicates by the noted binary state of the respective FFs 60-8 through 60-φ the order in which the requestors R7 through Rφ within each of the groups of requestors, e.g., group of requestors R3 and R2 and group of requestors R1 and Rφ, and between adjacent groups of requestors, e.g., between the group of requestors R3 and R2 and the adjacent group of requestors R1 and Rφ,—see Table A—have been granted pre-emptive and/or rotational priority. That is, FFs 60-9 through 60-φ of priority history generator 46 store the order in which the requestors R7 through Rφ have been granted priority, i.e., FFs 60-9 through 60-φ accumulate and store the priority history of requestors R7 through Rφ. FFs 60-9 through 60-φ then, via FFs 60-5, 60-8, 60-7, 60-6 and 60-4, provide the respective history pointers S4, S3, S2, S1, Sφ that define such stored and accumulated priority history.

Normally, priority system 32 operates in its rotational priority mode; however, when desired, the pre-emptive priority mode may be selectively effected by the following simple operations:

1. couple a H ⇒ 4 signal (H ⇒ MC) to line 62 of FIG. 5.
2. couple a H ⇒ 4 signal (H ⇒ DUPH) to line 64 of FIG. 5.

These two signals master clear all priority history generator FFs 60-0 through 60-9 causing all history pointers Pφ through P4 to be forced to H ⇒ 4 , and, accordingly, to erase all prior accumulated history of the operation of priority system 32. With all prior accumulated history erased from priority history generator 46, priority system 32 has been selectively overridden to ensure that pre-emptive priority is granted to the highest priority ordered requestor next requesting service.

TABLE D

| HISTORY POINTER | FF | SIGNAL LEVEL | | HISTORY | |
|---|---|---|---|---|---|
| S 0 | 60-4-1 | L | R 1 | Last Pre-empted | R φ |
|  | 60-4-1 | H | R φ | " | R 1 |
| S 1 | 60-6-1 | L | R 3 | " | R 2 |
|  | 60-6-1 | H | R 2 | " | R 3 |
| S 2 | 60-7-1 | L | R 5 | " | R 4 |
|  | 60-7-1 | H | R 4 | " | R 5 |
| S 3 | 60-8-1 | L | R 7 | " | R 6 |
|  | 60-8-1 | H | R 6 | " | R 7 |
| S 4 | 60-5-1 | L | R 3 or R 2 | " | R 1 or R φ |
|  | 60-5-1 | H | R 1 or R φ | " | R 3 or R 2 |

To present a meaningful discussion of the present invention, FIG. 6 illustrates the timing diagram for five exemplary successive memory cycles 1 through 5. Because, in its rotational mode, priority system 32 of the present invention accumulates and reacts to the prior activity or history of the priority requests received from requestors R7 through Rφ, the exemplary timing diagram of FIG. 6 assumes the following conditions:

Memory Cycle 1

Requestors
  Rφ, R1, R5 are Active
  R2, R3, R4, R6, R7 are Inactive
    i.e., only requestors Rφ, R1, R5 are requesting service — see Table C.
Priority Bits
  Pφ, P1 are Active
  P2 is Inactive
    i.e., requestor R3 was last honored — see Table B.
History Pointers
  S1, S4 are L
  Sφ, S2, S3 are H
    i.e., requestor R3 last pre-empted R2 and requestor R3 or R2 last pre-empted R1 or Rφ — see Table D.
Note that:
Under these above conditions from Memory Cycle 1 it is apparent that with requestors Rφ, R1, R5 requesting service and with history pointers S1 and S4 L, requestor R5, having the highest priority, gains priority.

Memory Cycle 2

Requestors
  Rφ, R1, R2, R3 are Active
  R4, R5, R6, R7 are Inactive
Priority Bits
  Pφ, P2 are Active
  P1 is Inactive
History Pointers
  S1, S4 are L
  Sφ, S2, S3 are H
Under these above conditions from Memory Cycle 2 it is apparent that with requestors Rφ, R1, R2, R3 requesting service and with history pointers S1, S4 L, requestor R1 gains priority.

Memory Cycle 3

Requestors
  Rφ, R2, R3 are Active
  R1, R4, R5, R6, R7 are Inactive
Priority Bits
  Pφ is Active
  P1, P2 are Inactive
History Pointers
  Sφ, S1, S2 are L
  S3, S4 are H
Under these above conditions from Memory Cycle 3 it is apparent that with requestors Rφ, R2, R3 requesting service and with history pointers Sφ, S1 and S2 L, requestor R2 gains priority.

Memory Cycle 4

Requestors
  Rφ, R3 are Active
  R1, R2, R4, R5, R6, R7 are Inactive
Priority Bits
  P1 is Active
  Pφ, P2 are Inactive
History Pointers
  Sφ, S2, S4 are L
  S1, S3 are H
Under these above conditions from Memory Cycle 4 it is apparent that with requestors Rφ, R3 requesting service and with history pointers Sφ, S2 and S4 L, requestor Rφ gains priority.

Memory Cycle 5

Requestors
  R3 is Active
  Rφ, R1, R2, R4, R5, R6, R7 are Inactive
Priority Bits
  Pφ, P1, and P2 are Inactive
History Pointers
  S2 is L
  Sφ, S1, S3, S4 are H
Under these above conditions from Memory Cycle 5 it is apparent that with only requestor R3 requesting service the status of history pointer S2 is ignored and requestor R3 gains priority.

To best understand the sequence of operations of priority system 32 as they occur during a memory cycle, the following relative timing relationships are observed:

1. LD RX signal on line 66 of FIG. 3 Sets/Clears Priority Request Register 40 FFs 40-0 through 40-7 as determined by the requestor priority request signals Rφ through R7 on the associated input lines 40-0-0 through 40-7-0.

LD New Priority History signal on line 70 of FIG. 5 Sets/Clears Priority History Generator 46 FFs 60-5, -5, -6, -7, -8 as determined by the Set/Clear states of FFs 60-0, -1, -2, -3, -9, respectively — this establishes the new history pointers Sφ, S1, S2, S3, S4 on lines 60-4-1, 60-6-1, 60-7-1, 60-8-1, 60-5-1, respectively.

2. Priority Bits Pφ, P1, P2 from ORs 50, 51, 52 of 3-bit Priority Encoder 42 are switched Active/Inactive as determined by the conditions of History Pointers Sφ through S4 and the Set/Clear states of Priority Request Register 40 FFs 40-0 through 40-7. Requestor RX, as defined by Priority Bits Pφ, P1, P2, is honored.

3. The output of 1-out-of-8 Priority Decoder 44 switches as determined by the new Priority Bits Pφ, P1, P2.

4. Priority History Generator 46 ORs 74, 75, 76, 77, 78 switch as determined by the new output of 1-out-of-8 Priority Decoder 44.

5. Update Priority History signal on line 72 of FIG. 5 Sets/Clears Priority History Generator 46 FFs 60-0, 60-1, 60-2, 60-3 and 60-9 as determined by the Active/Inactive states of ORs 74, 75, 76, 77, 78 and the output of 1-out-of-8 Priority Decoder 44.

6. Honored requestor RX removes its Active priority request signal from its associated line 40-0-0 through 40-7-0.

Memory Cycle 1 is initiated by an LD RX ⇒ L ⇒ ꝯ ⇒ Active signal on line 66 of FIG. 3 and a Load New Priority History ⇒ L ⇒ ꝯ ⇒ Active signal on line 70 of FIG. 5. Note: the LD RX ⇒ Active signal on line 66 of FIG. 3 functions to establish the timing for the successive memory cycles 1, 2, 3, 4, 5 exemplified by FIG. 6. With both EN RX ⇒ L ⇒ ꝯ ⇒ Active on line 68 and LD RX Active on line 66, all priority requests, i.e., that are H ⇒ ꝯ ⇒ Active and that are coupled by requestors Rφ through R7 to their respectively associated lines 40-0-0 through 40-7-0 are loaded into their respectively associated priority request register 40 FFs 40-0 through 40-7. With the above noted assumptions, only requestors Rφ, R1 and R5 are coupling a priority request signal to their respectively associated lines 40-0-0, 40-1-0, and 40-5-0 causing priority request FFs 40-0, 40-1 and 40-5 to be switched into the Set state — and of course priority request FFs 40-2, 40-3, 40-4, 40-6 and 40-7 are switched into their Clear state.

Concurrently, the Load New Priority History signal on line 70 is coupled to the Enable (E) inputs of Priority History Generator 46 FFs 60-4 through 60-8 which as determined by the Set/Clear state of FFs 60-0 through 60-3 and 60-9, respectively, are switched into the corresponding Set/Clear state. With Priority History Generator 46 FFs 60-1 and 60-2 Set and FFs 60-0, 60-3 and 60-9 Clear, only the corresponding FFs 60-5 and 60-6 are set while FFs 60-4, 60-7 and 60-8 are Clear.

Next, priority bits P$\phi$, P1, P2 from ORs 50, 51, 52 of 3-bit priority encoder 42 are switched Active/Inactive as determined by the conditions of history pointers S$\phi$ through S4 and the Set/Clear states of priority request register 40 FFs 40-0 through 40-7. Reference to Table C indicates that with the above-noted conditions, priority bits P$\phi$ and P2 are switched Active $\Rightarrow$ H $\Rightarrow$ 1 while priority bits P1 is switched Inactive $\Rightarrow$ L $\Rightarrow$ 0, i.e., $101_2 = 5_{10}$. This indicates that requestor R5 is to be next honored. At this time or soon after, requestor R5 as defined by priority bits P$\phi$, P1, P2 is honored by priority system 32.

Next, with the new priority bits P$\phi$, P1, P2 from ORs 50, 51, 52 being coupled as inputs to 1-out-of-8 decoder 44 only AND 44-5 is switched ACtive while all other ANDs 44-0 through 44-4 and 44-6 and 44-7 are switched Inactive.

Next, the Active output from AND 44-5 causes OR 77 to be switched Active while all other ORs 74, 75, 76 and 78 are switched Inactive.

Next, Update Priority History signal on line 72 of FIG. 5 Sets/Clears Priority History Generator 46 FFs 60-0, 60-1, 60-2, 60-3 and 60-9 as determined by the Active/Inactive states of ORs 74, 75, 76, 77, 78 and the output of 1-out-of-8 priority decoder 44. The Active output of OR 77 at the Clock (C) input of FF 60-3, the Active input on line 44-5-0 at the Data (D) input of FF 60-3 and the Update Priority History signal on line 72 at the Enable (E) input of FF 60-3 cause FF 60-3 to be Set. Because no Active signal is coupled to their Clock (C) inputs, FFs 60-1 and 60-2 remain Set while FFs 60-0 and 60-9 remain Clear.

Lastly, the honored requestor R5 removes its Active priority request signal from its associated line 40-5-0 of priority request register 40.

It is to be noted that during Memory Cycle 1 requestors R2 and R3 have requested service by coupling an Active priority request signal to their associated lines 40-2-0 and 40-3-0 of priority request register 40.

Memory Cycle 2 is initiated by an LD RX Active signal on line 66 and a Load New Priority History Active signal on line 70. As with Memory Cycle 1, all Active priority requests that are coupled by requestors R$\phi$ through R7 to their respectively associated lines 40-0-0 through 40-7-0 are loaded into their respectively associated priority request FFs 40-0 through 40-7. With the above noted assumptions, only requestors R$\phi$, R1, R2, and R3 are coupling a priority request signal to their respectively associated lines 40-0-0, 40-1-0, 40-2-0, and 40-3-0, respectively, causing priority request FFs 40-0, 40-1, 40-2, and 40-3 to be switched into the Set state.

Concurrently, the Load New Priority History signal on line 70 is coupled to the Enable (E) inputs of FFs 60-4 through 60-8 which as determined by the Set/Clear state of FFs 60-0 through 60-3 and 60-9, respectively, are switched into the corresponding Set/Clear state. With FFs 60-1, 60-2 and 60-3 Set and FFs 60-0 ad 60-9 Clear, only the corresponding FFs 60-5, 60-6 and 60-7 are Set while FFs 60-4 and 60-8 are Clear.

Next, priority bits P$\phi$, P1, P2 from ORs 50, 51, 52 are switched as determined by the Active/Inactive conditions of history pointers s$\phi$ through S4 and the Set/Clear states of FFs 40-0 through 40-7. Reference to Table C indicates that with the above-noted conditions, priority bit P$\phi$ is switched Active while priority bits P1 and P2 are switched Inactive, i.e., $001_2 = 1_{10}$. This indicates that requestor R1 is to be next honored. At this time or soon after, requestor R1 as defined by priority bits P$\phi$, P1, P2 is honored by priority system 32.

Next, with new priority bits P$\phi$, P1, P2 from ORs 50, 51, 52 being coupled as inputs to 1-out-of-8 priority decoder 44 only AND 44-1 is switched Active while all other ANDs 44-0, 44-2 through 44-7 are switched Inactive.

Next, the Active output from AND 44-1 causes ORs 74 and 75 to be switched Active while all other ORs 76, 77 and 78 are switched Inactive.

Next, Update Priority History signal on line 72 Sets/Clears FFs 60-0, 60-1, 60-2, 60-3 and 60-9 as determined by the Active/Inactive states of ORs 74, 75, 76, 77 and 78 and the output of 1-out-of-8 priority decoder 44. The Active output of OR 74 at the Clock (C) input of FF 60-0, the Active input on line 44-1-0 at the Data (D) input of FF 60-0 and the Update Priority History signal on line 72 at the Enable (E) input of FF 60-0 cause FF 60-0 to be Set. Additionally, the Active output of OR 75 at the Clock (C) input of FF 60-1, the Inactive output of OR 76 at the Data (D) input of FF 60-1 and the Update Priority History signal on line 72 at the Enable (E) input of FF 60-0 cause FF 60-1 to be Cleared. Because no Active signal is coupled to their Clock (C) inputs, FFs 60-2 and 60-3 remain Set while FF 60-9 remains Clear.

Lastly, the honored requestor R1 removes its Active priority request signal from its associated line 40-1-0 of priority request register 40.

Memory Cycle 3 is initiated by an LD RX Active signal on line 66 and a Load New Priority History Active signal on line 70. As with Memory Cycle 1, all Active priority requests that are coupled by requestors R$\phi$ through R7 to their respectively associated lines 40-0-0 through 40-7-0 are loaded into their respectively associated priority request FFs 40-0 through 40-7. With the above-noted assumptions, only requestors R$\phi$, R2 and R3 are coupling a priority request signal to their respectively associated lines 40-0-0, 40-2-0 and 40-3-0, respectively, causing priority request FFs 40-0, 40-2 and 40-3 to be switched into the Set state.

Concurrently, the Load New Priority History signal on line 70 is coupled to the Enable (E) inputs of FF 60-4 through 60-8 which as determined by the Set/Clear state of FF 60-0 through 60-3 and 60-9, respectively, are switched into the corresponding Set/Clear state. With FFs 60-0, 60-2 and 60-3 Set and FFs 60-1 and 60-9 Clear, only the corresponding FFs 60-4, 60-6 and 60-7 are Set while FFs 60-5 and 60-8 are Clear.

Next, priority bits P$\phi$, P1, P2 from ORs 50, 51, 52 are switched as determined by Active/Inactive conditions of history pointers S$\phi$ through S4 and the Set/Clear states of FFs 40-0 through 40-7. Reference to Table C indicates that with the above-noted conditions, priority bit P1 is switched Active while priority bits P$\phi$ and P2 are switched Inactive, i.e., $010_2 = 2_{10}$. This indicates that requestor R2 is to be next honored. At this time or soon after, requestor R2 as defined by priority bits P$\phi$, P1, P2 is honored by priority system 32.

Next, with new priority bits P$\phi$, P1, P2 from ORs 50, 51, 52 being coupled as inputs to 1-out-of-8 priority decoder 44, only AND 44-2 is switched Active while all other ANDs 44-0, 44-1, 44-3, through 44-7 are switched Inactive.

Next, the Active output from AND 44-2 causes ORs 75 and 76 to be switched Active while all other ORs 74, 77 and 78 are switched Inactive.

Next, Update Priority History signal on line 72 Sets/Clears FFs 60-0, 60-1, 60-2, 60-3 and 60-9 as determined by the Active/Inactive states of ORs 74, 75, 76, 77 and 78 and the output of 1-out-of-8 priority decoder 44. The Active output of OR 75 at the Clock (C) input of FF 60-1, the Active output of OR 76 at the Data (D) input of FF 60-1 and the Update Priority History signal on line 72 at the Enable (E) input of FF 60-1 cause FF 60-1 to be Set. Additionally, the Active output of OR 76 at the Clock (C) input of FF 60-2, the Inactive signal on line 44-3-0 and the Update Priority History signal on line 72 at the Enable (E) input of FF 60-2 cause FF 60-2 to be Cleared. Because no active signal is coupled to their Clock (C) inputs, FFs 60-0 and 60-3 remain Set whle FF 60-9 remains Clear.

Lastly, the honored requestor R2 removes its Active priority request signal from its associated line 40-2-0 of priority request register 40.

Memory Cycle 4 is initiated by an LD RX Active signal on line 66 and a Load New Priority History Active signal on line 70. As with Memory Cycle 1, all Active priority requests that are coupled by requestors R$\phi$ through R7 to their respectively associated lines 40-0-0 through 40-7-0 are loaded into their respectively associated request FFs 40-0 through 40-7. With the above-noted assumptions, only requestors R$\phi$ ad R3 are coupling a priority request signal to their respectively associated lines 40-0-0 and 40-3-0, respectively, causing priority request FFs 40-0 and 40-3 to be switched into the Set state.

Concurrently, the Load New Priority History signal on line 70 is coupled to the Enable (E) inputs of FFs 60-4 through 60-8 which as determined by the Set/Clear state of FFs 60-0 through 60-3 and 60-9, respectively, are switched into the corresponding Set/Clear state. With FFs 60-0, 60-1 and 60-3 Set and FFs 60-2 and 60-9 Clear, only the corresponding FFs 60-4, 60-5 and 60-7 are Set while FFs 60-6 and 60-8 are Clear.

Next, priority bits P$\phi$, P1, P2 from ORs 50, 51, 52 are switched as determined by the Active/Inactive conditions of history pointers S$\phi$ through S4 and the Set/Clear states of FFs 40-0 through 40-7. Reference to Table C indicates that with the above-noted conditions, priority bits P$\phi$, P1, P2 are switched Inactive, i.e., $000_2 = 0_{10}$. This indicates that requestor R$\phi$ is to be next honored. At this time or soon after, requestor R$\phi$ as defined by priority bits P$\phi$, P1, P2 is honored by priority system 32.

Next, with new priority bits P$\phi$, P1, P2 from ORs 50, 51, 52 being coupled as inputs to 1-out-of-8 priority decoder 44 only AND 44-0 is switched Active while all other ANDs 44-1 through 44-7 are switched Inactive.

Next, the Active output from AND 44-9 causes ORs 74 and 75 to be switched Active while all other ORs 76, 77 and 78 are switched Inactive.

Next, Update Priority History signal on line 72 Sets/Clears FFs 60-0, 60-1, 60-2, 60-3 and 60-9 as determined by the Active/Inactive states of ORs 74, 75, 76, 77 and 78 and the output of 1-out-of-8 priority decoder 44. The Active output of OR 74 at the Clock (C) input of FF 60-0, the Inactive signal on line 44-1-0 at the Data (D) input of FF 60-0 and the Update Priority History signal on line 72 at the Enable (E) input of FF 60-0 cause FF 60-0 to be Cleared. Additionally, the Active output of OR 75 at the Clock (C) input of FF 60-1, the Inactive output of OR 76 at the Data (D) input of FF 60-1 and the Update Priority History signal on line 72 at the Enable (E) input of FF 60-1 cause FF 60-1 to be Cleared. Because no Active signal is coupled to their Clock (C) inputs, FF 60-3 remains Set while FF 60-2 and 60-9 remain Clear.

Lastly, the honored requestor R$\phi$ removes its Active priority request signal from its associated line 40-0-0 of priority request register 40.

Memory Cycle 5 is initiated by an LD RX Active signal on line 66 and a Load New Priority History Active signal on line 70. As with Memory Cycle 1, all Active priority requests that are coupled by requestors R$\phi$ through R7 to their respectively associated lines 40-0-0 through 40-70-0 are loaded into their respectively associated priority request FFs 44-0 through 40-7. With the above-noted assumptions, only requestor R3 is coupling a priority request signal to its associated line 40-3-0, causing priority request FF 40-3 to be switched into the Set state.

Concurrently, the Load New Priority History signal on line 70 is coupled to the Enable (E) inputs of FFs 60-4 through 60-8 which as determined by the Set/Clear state of FFs 60-0 through 60-3 and 60-9, respectively, are switched into the corresponding Set/Clear state. With FF 60-3 Set and FF 60-0, 60-1, 60-2 and 60-9 Clear, only the corresponding FF 60-7 is Set while FFs 60-4, 60-5, 60-6 and 60-8 are Clear.

Next, priority bits P$\phi$, P1, P2 from ORs 50, 51, 52 are switched as determined by the Active/Inactive conditions of history pointers S$\phi$ through S4 and the Set/Clear states of FFs 40-0 through 40-7. Reference to Table C indicates that with the above-noted conditions, priority bits P$\phi$, P1 are switched Active while priority bit P2 is switched Inactive, i.e., $011_2 = 3_{10}$. This indicates that requestor R3 is to be next honored. At this time or soon after, requestor R3 as defined by priority bits P$\phi$, P1, P2 is honored by priority system 32.

Next, with new priority bits P$\phi$, P1, P2 from ORs 50, 51, 52 being coupled as inputs to 1-out-of-8 priority decoder 44 only AND 44-3 is switched Active while all other ANDs 44-0, 44-1, 44-2, 44-4, through 44-7 are switched Inactive.

Next, the Active output from AND 44-3 causes ORs 75 and 76 to be switched Active while all other ORs 74, 77 and 78 are switched Inactive.

Next, Update Priority History signal on line 72 Sets/Clears FFs 60-0, 60-1, 60-2, 60-3 and 60-9 as determined by the Active/Inactive states of ORs 74, 75, 76, 77 and 78 and the output of 1-out-of-8 priority decoder 44. The Active output of OR 75 at the Clock (C) input of FF 60-1, the Active output of OR 77 at the Data (D) input of FF 60-1 and the Update Priority History signal on line 72 at the Enable (E) input of FF 60-1 cuase FF 60-1 to be Set. Additionally, the Active output of OR 76 at the Clock (C) input of FF 60-2, the Inactive signal on line 44-3-0 at the Data (D) input of FF 60-2 and the Update Priority History signal on line 72 at the Enable (E) input of FF 60-2 cause FF 60-2 to be Set. Because no Active signal is coupled to their Clock (C) inputs, FF 60-3 remains Set while FFs 60-0 and 60-9 remain Clear.

Lastly, the honored requestor R3 removes its Active priority request signal from its associated line 40-3-0 of priority request register 40.

What is claimed is:

1. A priority system, comprising:
   priority encoder means adapted to receive selected ones of R priority request signals during successive memory cycles, where R is a positive integer of 4 or greater having a descending ordered pre-emptive priority, said R priority request signals being arranged in at least first and second groups of priority request signals of at least first and second priority request signals per group, for generating output signals that identify the one priority request signal that is to be granted priority during each one of said successive memory cycles;
   priority history generator means responsively coupled to said priority encoder means output signals for accumulating and storing the priority history of the priority request signals that have been granted priority over said successive memory cycles and generating output signals that define the stored priority history of said priority request signals; and
   means coupling said priority history generator means output signals to said priority encoder means and conditioning said priority encoder means to encode said R priority request signals during each of said successive memory cycles for rotating priority between the priority request signals within eachh of said first and second groups of priority request signals and between said first and second groups of priority request signals during each of said successive memory cycles.

2. The priority system of claim 1 in which said priority history generator means includes means for erasing said stored priority history and selectively overriding said rotational priority ensuring that pre-emptive priority is granted to the priority request signals as determined by the descending ordered pre-emptive priority of said R priority request signals.

3. A priority system, comprising:
   priority encoder means adapted to receive R priority request signals, where R is a positive integer of 4 or greater having a descending ordered pre-emptive priority, said R priority request signals being arranged in at least first and second groups of priority request signals of at least first and second priority request signals per group, for generating output signals that identify the one priority request signal that is to be granted priority;
   means for coupling the received ones of said R priority request signals to said priority encoder means during successive memory cycles;
   priority history generator means responsively coupled to said priority encoder means output signals for accumulating and storing the order in which all of said R priority request signals have been granted priority over said successive memory cycles and then generating output signals that define the stored priority history of said request signals, said stored priority history including a record of all of the priority request signals that have been granted priority over said successive memory cycles, the order in which said priority request signals have been granted priority over said successive memory cycles and what priority request signals have pre-empted the requests of what other higher or lower priority ordered priority request signals over said successive memory cycles; and
   means coupling said priority history generator means output signals to said priority encoder means and conditioning said priority encoder means to encode said R priority request signals during each of said successive memory cycles for rotating priority between the priority request signals within each of said first and second groups of priority request signals and between said first and second groups of priority request signals during each of said successive memory cycles.

4. In the priority system of claim 3, said priority encoder means conditioned by said stored priority history for rotating:
   the first and second priority request signals of the first group of priority request signals if both request service during the same memory cycle,
      if the first priority request signal was last honored then the second priority request signal is honored, but
      if the second priority request signal was last honored then the first priority request signal is honored;
   the first and second priority request signals of the second group of priority request signals if both request service during the same memory cycle,
      if the first priority request signal was last honored then the second priority request signal is honored, but
      if the second priority request signal was last honored then the first priority request signal is honored;
   the first and second priority request signals of the first group of priority request signals and the first and second priority request signals of the second group of priority request signals if the first or second priority request signal of the first group of priority request signals and the first or second priority signal of the second group of priority request signals both request service during the same memory cycle,
      if the first or second priority request signal of the first group of priority request signals was last honored then the first or second priority request signal of the second group of priority request signals is honored, but,
      if the first or second priority request signal of the second group of priority request signals was last honored then the first or second priority request signal of the first group of priority request signals is honored.

5. The priority system of claim 4 in which said priority history generator means includes means for selectively erasing said stored priority history and overriding said rotating priority ensuring that pre-emptive priority is granted to the received ones of said R priority request signals as determined by the descending ordered pre-emptive priority of said R priority request signals.

6. A priority system, comprising:
   R requestors, where R is a positive integer of 4 or greater having a descending ordered pre-emptive priority, said R requestors being arranged in at least first and second groups of requestors of at least first and second requestors per group, each of said R requestors generating an associated one of R priority request signals;

priority request register means including R priority request FFs, each priority request FF coupled to an associated one of said R requestors for receiving and storing an associated one of the R priority request signals from the associated requestor;

means coupling successive memory cycle defining gating pulses to said priority request register means for gating ones of said R priority request signals into said priority request register means during successive memory cycles;

priority encoder means responsively coupled to the ones of said R priority request signals that are gated into said priority request register means during each successive one of said successive memory cycles for generating encoded output signals that identify the selected one of said R requestors that is to be granted priority;

priority history generator means responsively coupled to said encoded output signals for accumulating and storing the priority history of said R requestors over said successive memory cycles and then generating history pointers that define said stored priority history, said stored priority history including a record of all of said R requestors that have been granted priority over said successive memory cycles, the order in which said R requestors have been granted priority over said successive memory cycles and which ones of said R requestors have pre-empted the priority request signals of what other higher or lower priority ordered ones of said R requestors over said successive memory cycles; and means coupling said history pointers to said priority encoder means, said history pointers conditioning said priority encoder means to encode said R priority request signals, when received from said R requestors during said successive memory cycles, for rotating priority between the requestors within each of said first and second groups of requestors and between said first and second groups of requestors.

7. In the priority system of claim 6, said priority encoder means conditioned by said stored priority history means for rotating:

the first and second requestors of the first group of requestors if both request service during the same memory cycle,
  if the first requestor was last honored then the second requestor is honored, but
  if the second requestor was last honored then the first requestor is honored;

the first and second requestors of the second group of requestors if both request service during the same memory cycle,
  if the first requestor was last honored then the second requestor is honored, but
  if the second requestor was last honored then the first requestor is honored;

the first and second requestors of the first group of requestors and the first and second requestors of the second group of requestors if the first or second requestor of the first group of requestors and the first or second requestor of the second group of requestors both request service during the same memory cycle,
  if the first or second requestors of the first group of requestors was last honored then the first or second requestor of the second group of requestors is honored, but
  if the first or second requestor of the second group of requestors was last honored then the first or second requestor of the first group of requestors is honored.

8. A priority system, comprising:

R requestors, where R is a positive integer of 4 or greater having a descending ordered pre-emptive priority, said R requestors being arranged in at least first and second groups of requestors of at least first and second requestors per group;

priority request register means including a plurality of priority request FFs, each priority request FF coupled to an associated one of said R requestors for receiving and storing a priority request signal from the associated requestor;

means coupling successive memory cycle defining gating pulses to said priority request register means for gating ones of said priority request signals into said priority request register means during successive memory cycles;

priority encoder means coupled to the priority request signals that are stored in the associated priority request FFs of said priority request register means for determining the one requestor that is to be next granted priority, said priority encoder means generating output signals that identify the one requestor that is to be next granted priority;

priority history generator means responsively coupled to said priority encoder means output signals for accumulating and storing the priority history of said R requestors, said stored priority history including the order in which all of said R requestors have been granted priority by said priority encoder means over said successive memory cycles, and then generating output signals that define said stored priority history; and means coupling said priority history generator means output signals to said priority encoder means and conditioning said priority encoder means to encode said priority request signals when received from said priority request register means for rotating priority between the requestors within each of said first and second groups of requestors and between said first and second groups of requestors in which, the first and second requestors of the first group of requestors rotate if both request service during the same memory cycle,
  if the first requestor was last honored then the second requestor is honored, but
  if the second requestor was last honored then the first requestor is honored;

the first and second requestors of the second group of requestors rotate if both request service during the same memory cycle,
  if the first requestor was last honored then the second requestor is honored, but
  if the second requestor was last honored then the first requestor is honored;

the first and second requestors of the first group of requestors and the first and second requestors of the second group of requestors rotate if the first or second requestor of the first group of requestors and the first or second requestor of the second group of requestors both request service during the same memory cycle,
  if the first or second requestor of the first group of requestors was last honored then the first or second requestor of the second group of requestors is honored, but
  if the first or second requestor of the second group of requestors was last honored then the first or second requestor of the first group of requestors is honored.

9. A priority system, comprising:

R requestors, where R is a positive integer of 4 or greater having a descending ordered pre-emptive priority, said R requestors being arranged in at least first and second groups of requestors of at least first and second requestors per group;

priority request register means including R priority request FFs, each priority request FF coupled to an associated one of said R requestors for receiving and storing an associated one of R priority request signals from the associated requestor;

means coupling successive memory cycle defining gating pulses to said priority request register means for gating ones of sid R priority request signals into said priority request register means during successive memory cycles;

priority encoder means coupled to the priority request signals that are stored in the associated priority request FFs of said priority request register means for determining the one requestor that is to be granted priority during each of said successive memory cycles, said priority encoder means generating P priority bits P-1 through 0, where $R = 2^P$, that identify the one requestor that is to be next granted priority;

1-out-of-R priority decoder means responsively coupled to said P priority bits for decoding said P priority bits and coupling an output signal to a selected one of R priority decoder means output lines;

priority history generator means responsively coupled to the selected one of said R priority decoder output lines for accumulating and storing the history of the order in which said R requestors have been granted priority by said priority encoder means over said successive memory cycles and then generating S history pointers S-1 through 0 that define said stored priority history;

means coupling said S history pointers to said priority encoder means, said history pointers conditioning said priority encoder means to encode said R priority request signals for rotating priority between the requestors within each of said first and second groups of requestors and between said first and second groups of requestors in which, the first and second requestors of the first group of requestors rotate if both request service during the same memory cycle, if the first requestor was last honored then the second requestor is honored, but if the second requestor was last honored then the first requestor is honored;

the first and second requestors of the second group of requestors rotate if both request service during the same memory cycle, if the first requestor was last honored then the second requestor is honored, but if the second requestor was last honored then the first requestor is honored; the first and second requestors of the first group of requestors and the first and second requestors of the second group of requestors rotate if the first or second requestor of the first group of requestors and the first or second requestor of the second group of requestors both request service during the same memory cycle, if the first or second requestor of the first group of requestors was last honored then the first or second requestor of the second group of requestors is honored, but if the first or second requestor of the second group of requestors was last honored then the first or second requestor of the first group of requestors is honored; and means coupled to said priority history generator means for selectively erasing said stored priority history and overriding said rotational priority ensuring that pre-emptive priority is granted to the requestor as determined by the descending ordered pre-emptive priority of said R requestors.

* * * * *